Jan. 3, 1933.   G. R. RAWLES ET AL   1,892,852
CYLINDER CONSTRUCTION
Filed Oct. 28, 1930

Inventors
G. R. Rawles
Alvin Tedder
By
Watson E. Coleman

Patented Jan. 3, 1933

1,892,852

UNITED STATES PATENT OFFICE

GARNETT R. RAWLES AND ALVIN TEDDER, OF MEMPHIS, TENNESSEE

CYLINDER CONSTRUCTION

Application filed October 28, 1930. Serial No. 491,772.

This invention relates to improvements in packings and pertains particularly to an improved method of preventing leakage about the piston rod of engines.

The primary object of the present invention is to provide an improved means or structure whereby leakage about the piston rods of steam operated pistons is prevented and at the same time doing away with the usual packing, packing gland and stuffing box.

Another object of the invention is to provide an improved leakage preventing means about steam piston rods, which is of simpler construction than the packings and packing glands at present employed and at the same time does not cause the wearing of the rod as packing glands do.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

Figure 1:
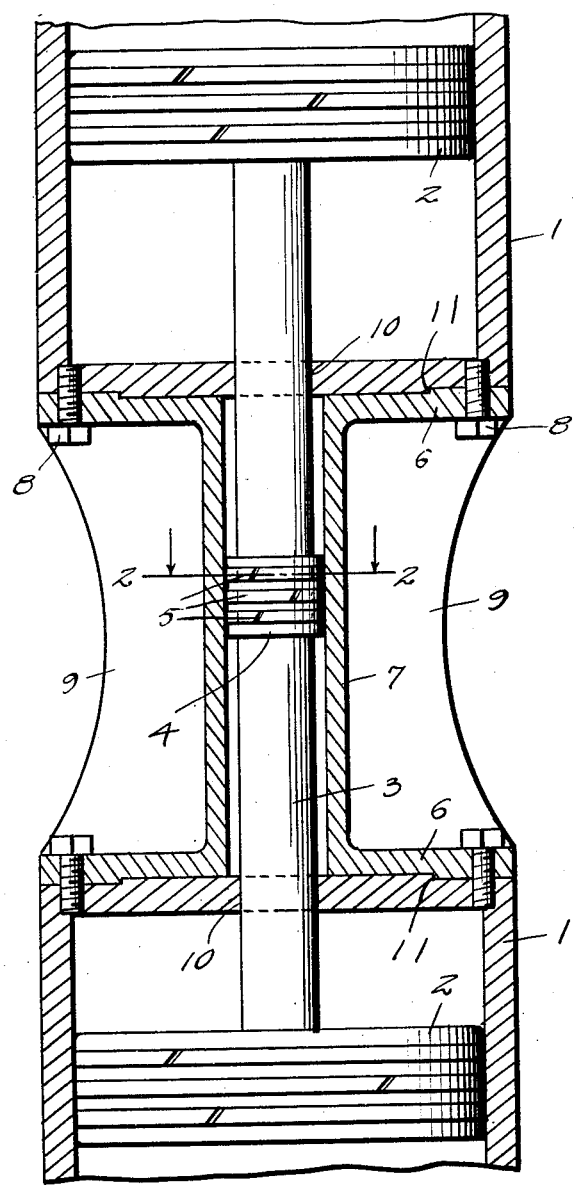
Figure 1 is a view in longitudinal section of a pair of cylinders showing the pistons therein connected by a piston rod forming a part of the present invention.
Figure 2:
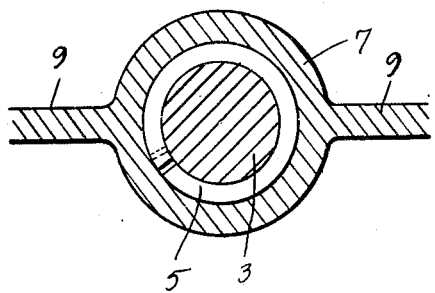
Figure 2 is a sectional view taken on the line 2—2 of Figure 1.

Referring more particularly to the drawing wherein like numerals of reference indicate corresponding parts throughout the several views, there is illustrated a pair of cylinders, each of which is indicated by the numeral 1, in which are positioned the usual packing ring carrying pistons 2. While the present invention has been shown in connection with a pair of opposed cylinders and pistons, it is, of course, to be understood that it is not to be limited to such use for it will be readily obvious that it may be used in connection with a single cylinder and piston with the same efficiency as with a double cylinder structure.

The pistons 2 are connected by a rod 3 which, substantially midway between its ends, has formed integral therewith the series of bands or rings 4 between which are placed packing rings 5. The opposed heads of the cylinders 1 have secured thereto the plates 6 which are joined together by a sleeve 7, the interior of which is machined to form a smooth contact surface for the packing rings 5.

These plates 6 are secured to the heads of the cylinders in any suitable manner such, for example, as by the use of tap screws 8, and the structure is reinforced between the plates 6 by longitudinally extending webs 9 which connect the plates and join with the sleeve 7 along their inner sides.

The adjacent ends or heads of the cylinders are provided with apertures 10 for the passage of the piston rod, which apertures are of a size to snugly receive the rod. It will, of course, be understood that even though the fit of the rod 3 in the apertures 10 is snug, still a loss of power would be had if some means were not provided to prevent this, and this is prevented by the employment of the packing rings 5 upon the piston rod which work snugly in the sleeve 7, the end of which, of course, covers the opening through which the rod passes. Loss of pressure between the contacting surfaces of the plates and the heads of the cylinders is prevented by the formation of a joint therebetween as indicated by the numeral 11.

While the invention has been shown applied to a double piston and cylinder structure, it will, of course, be clear that it may be efficiently employed in connection with a single piston and cylinder structure as previously pointed out. Therefore, its use is not to be restricted to a structure of the character illustrated.

Having thus described our invention, what we claim is:—

The combination with a pair of power cylinders arranged in end opposed relation and each having a piston therein, of a body disposed between the cylinders and connecting the same and consisting of a pair of plates each being secured to an end of a cylinder and a sleeve connecting said plates and opening at each end through one of the same against the adjacent end of the cylinder, a piston rod having each end connected with a piston and passing from the cylinders through said sleeve, fixed ring members surrounding and in spaced relation on said rod midway of its ends said rod being of materially smaller diameter than the interior of the sleeve, packing rings carried by said rod and disposed between said fixed rings and located in said sleeve for engagement with the surrounding wall thereof, and a reinforcing web extending longitudinally of the sleeve and formed integral therewith and further connecting said plates.

In testimony whereof we hereunto affix our signatures.

GARNETT R. RAWLES.
ALVIN TEDDER.